United States Patent [19]

Symens et al.

[11] 4,263,148
[45] Apr. 21, 1981

[54] PROCESS FOR REMOVING HUMIC MATTER FROM PHOSPHORIC ACID SOLUTIONS

[75] Inventors: Raymond D. Symens, Lakewood; Robert S. Rickard, Golden, both of Colo.

[73] Assignee: Earth Sciences, Inc., Golden, Colo.

[21] Appl. No.: 28,455

[22] Filed: Apr. 9, 1979

[51] Int. Cl.³ ............... B03D 1/02; C01B 25/235
[52] U.S. Cl. ........................... 210/705; 210/727; 423/321 R; 423/321 S
[58] Field of Search ............ 71/34; 210/42 R, 44, 210/49, 51–54; 423/321 R, 321 S

[56] References Cited

U.S. PATENT DOCUMENTS

| | | | |
|---|---|---|---|
| 2,133,251 | 10/1938 | McCord | 423/321 R |
| 2,936,888 | 5/1960 | Williams | 423/321 R |
| 3,099,622 | 7/1963 | Woerther | 210/49 |
| 3,129,170 | 4/1964 | Ittlinger | 210/54 |
| 3,306,714 | 2/1967 | Goren | 423/321 R |
| 3,630,711 | 12/1971 | Burkert et al. | 71/34 |
| 3,637,348 | 1/1972 | Kraus et al. | 210/54 |
| 3,969,483 | 7/1976 | Stinson et al. | 210/54 |

FOREIGN PATENT DOCUMENTS

| | | | |
|---|---|---|---|
| 518955 | 3/1940 | United Kingdom | 210/44 |
| 476235 | 2/1976 | U.S.S.R. | 210/44 |

*Primary Examiner*—Peter A. Hruskoci
*Attorney, Agent, or Firm*—Hopgood, Calimafde, Kalil, Blaustein & Lieberman

[57] ABSTRACT

A process is disclosed for removing colloidal and non-colloidal humic matter from an aqueous solution of phosphoric acid, the process comprising (a) treating the phosphoric acid solution with a flocculant to flocculate the humic matter, (b) adding to the aqueous solution an effective amount of a phenol compound in order to destabilize the colloidal humic matter contained in the solution and to aid in the formation of froth, and (c) separating the humic matter from the solution by froth flotation.

11 Claims, 1 Drawing Figure

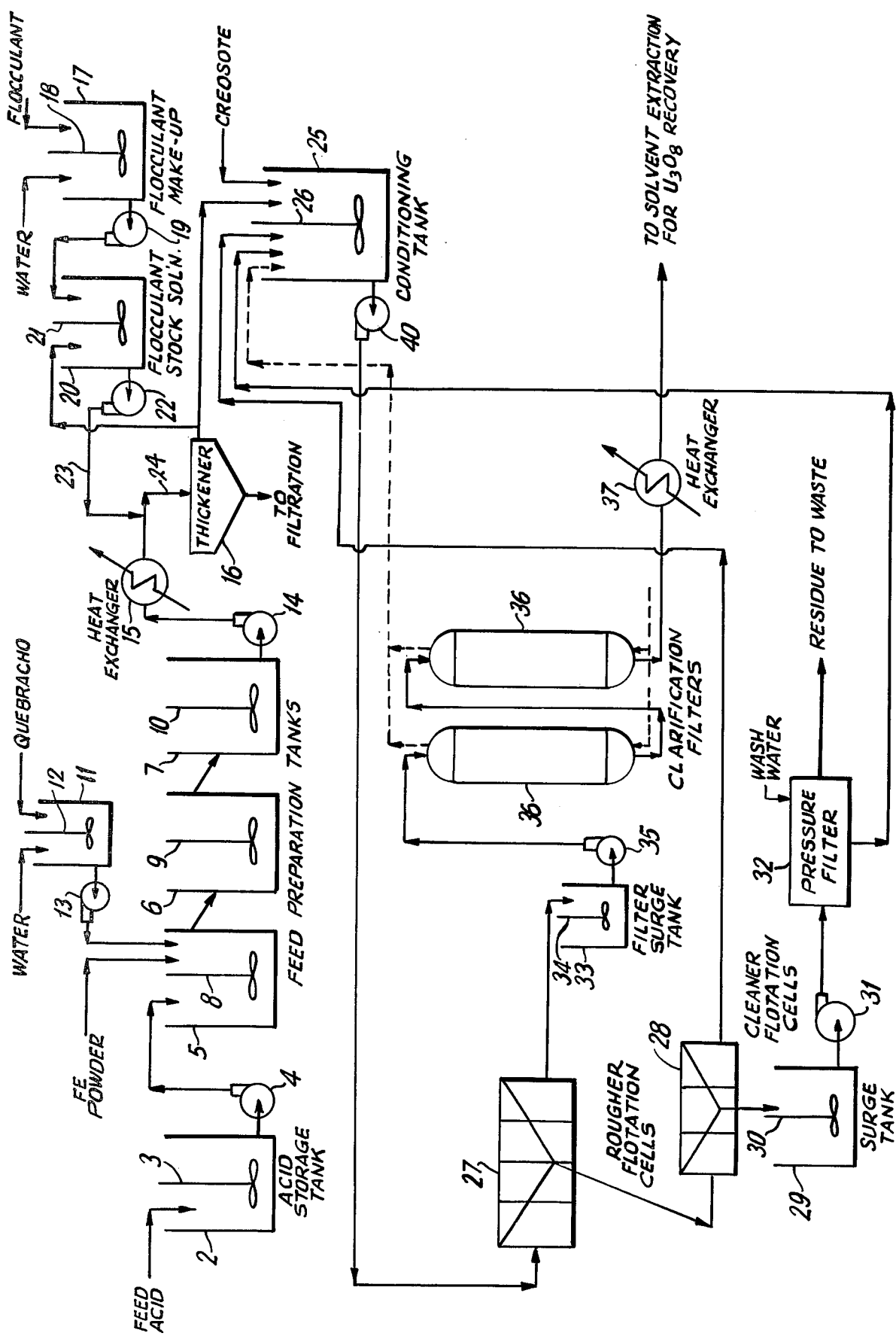

PROCESS FOR REMOVING HUMIC MATTER FROM PHOSPHORIC ACID SOLUTIONS

This invention relates to a process for removing colloidal and non-colloidal humic matter from aqueous solutions of phosphoric acid produced by the acidulation of phosphate rocks and, in particular, to the removal of humic matter from uranium-containing phosphoric acid solutions.

BACKGROUND OF THE INVENTION

Large deposits of marine phosphorites exist in the United States, particularly in Florida and the Western United States. These deposits are known to contain small amounts of uranium (e.g., about 50 to 200 ppm or 0.1 to 0.4 pound per ton of phosphate rock). Such ores are a valuable source of uranium.

Processes are known for producing phosphoric acid from phosphate rock by acidulating the rock with sulfuric acid, such processes being known as the "wet process". In this process, the phosphate rock is converted to a relatively dilute phosphoric acid solution, calcium sulfate also being formed in the reaction. The calcium sulfate is filtered out to provide an impure acid stream which typically contains about 30% by weight of $P_2O_5$ and the uranium originally present in the ore. Processes have been proposed for recovering uranium from the phosphoric acid solution using solvent extraction techniques selective to uranium.

However, the impure 30% acid, which can be either "black" or "green", contains measurable amounts of organic material, such as humic matter, which can have an adverse effect on the solvent extraction efficiency of uranium.

As with any solvent extraction process, it is important that the feed to the solvent extraction section be free of any particulate matter in order to avoid the formation of stable emulsions commonly called crud.

In cleaning impure phosphoric acid, filtration generally removes the suspended particulates but not the colloidal matter composed of organic or "humic" material.

The organic or humic matter referred to hereinabove is sometimes commonly referred to as "humic acid" or "humates". This material is not a well defined compound but is a mixture of polymers containing aromatic and heterocyclic structures, carboxyl groups and nitrogen. By colloidal humic matter is meant humic matter which has a particle size in the range of from about 1 to about 500 millimicrons.

When black phosphoric acid which is cleaned by filtration is subsequently processed by solvent extraction in order to recover uranium, there results an agglomeration and precipitation of the colloidal humic content of the acid and an intolerable build-up of solids or crud at the organic/aqueous interface of the solvent extraction circuit.

Several processes have been proposed for removing organic material from wet-process phosphoric acid.

In U.S. Pat. No. 4,087,512, a process is disclosed for removing solid organic material from wet-process phosphoric acid produced by the acidulation of uncalcined phosphate rock. The process utilizes an insoluble hydrocarbon liquid which is mixed with the phosphoric acid solution to effect selective removal of the organic matter. In summary, the process comprises mixing the hydrocarbon (e.g., kerosene) at a temperature not less than about 55° C. and not more than about 70° C. with the wet-process solution at a volume ratio of aqueous to organic of up to about 30:1, allowing the mixture to separate into an aqueous phase and an organic phase containing the solid organic matter and then separating the cleaned phosphoric acid from the hydrocarbon phase.

In a preferred embodiment, the volume ratio of aqueous to the organic liquid phase ranges from about 1:1 to 2:1. A disadvantage of this process is the large amount of hydrocarbon required for carrying out the process.

In U.S. Pat. No. 4,064,220, a process is proposed for purifying acid solutions of dissolved or colloidally dispersed organic matter by mixing with an acid solution an aldehyde or an aldehyde oligomer and a compound copolymerizable with the aldehyde (e.g., phenol) and allowing polymerization to take place. The polymer that forms separates from the solution and removes with it the organic matter. Alternatively, the aldehyde and the copolymerizable compound can be added as a precondensate to obtain the same result.

It would be desirable to provide a process which does not require the use of substantial amounts of reagents for removing humic matter from impure phosphoric acid solution. As a result of a search for such a process, a method has now been developed which enables the removal of humic matter from phosphoric acid in a simple and direct manner using a small but effective amount of an addition agent.

OBJECTS OF THE INVENTION

It is an object of the present invention to provide a process for treating an aqueous phosphoric acid solution so as to substantially remove colloidal and non-colloidal humic material therefrom.

Another object of the present invention is to provide a process for treating phosphoric acid such that subsequent uranium recovery from the phosphoric acid solution can be more efficiently effected.

A more specific object of the present invention is to provide a process for treating commercial grade black phosphoric acid solution to remove humic material therefrom such that subsequent solvent extraction of uranium from the black phosphoric acid solution can be carried out more effectively and efficiently.

Other objects and advantages of the present invention will become apparent from the following summary and description of the preferred embodiments of the present invention.

BRIEF DESCRIPTION OF THE DRAWING

The accompanying drawing is a flow sheet of one embodiment of the invention.

SUMMARY OF THE INVENTION

The present invention provides a process for removing colloidal and non-colloidal humic matter from an aqueous solution of phosphoric acid. The process consists essentially of (a) treating the solution with a flocculant to form solid or particle aggregates or flocs of humic matter, (b) further treating the aqueous solution with one or more phenol compounds in order to destabilize the colloidal humic matter contained in the solution and aid in forming a froth, and (c) separating the humic matter from the solution by froth flotation.

While the process of the invention was preferably developed for cleaning up black phosphoric acid for the subsequent recovery of uranium values therefrom by solvent extraction, the process is also broadly applicable to aqueous phosphoric acid solutions generally which contain humic matter, e.g., colloidal and non-colloidal humic matter.

DESCRIPTION OF THE PREFERRED EMBODIMENTS

The phosphoric acid which may be treated in accordance with the present invention is an aqueous solution of phosphoric acid having a concentration generally ranging from about 15 to 55, typically from about 25 to about 35, and preferably from about 27 to about 32 percent by weight phosphoric acid (as $P_2O_5$) based upon the total weight of the solution.

Commercial grade black phosphoric acid generally contains impurities in the form of suspended particulates and colloids. Suspended particulate impurities have a particle size which is larger than that of the colloidal materials. These suspended particles comprise inorganic crystalline salts and organic humic material. The colloidal particulate impurities are comprised substantially of organic or humic material.

By employing the present process, the majority of the suspended particles may be removed by flocculation and thickening. The rest of the suspended particles and substantially all of the colloidal particles may be removed by treatment with the phenol compound followed by separation using flotation techniques.

Accordingly, the present process removes both colloidal and suspended humic matter from the aqueous solution of phosphoric acid.

The first step of the process comprises treating the aqueous solution of phosphoric acid with a flocculant to form particle aggregates or flocs of humic matter. The flocculant which is used to treat the phosphoric acid may be any flocculant well known to those skilled in this art, such as those disclosed in U.S. Pat. No. 3,099,622. Polyacrylamide flocculants are particularly preferred, for example, anionic high molecular weight polyacrylamide flocculants, such as the polyacrylamide flocculant sold under the trademark Polyhall M-59.

The amount of flocculant used need only be sufficient to effect flocculation (e.g., small but effective amount) and may depend to some extent upon the nature and molecular weight of the particular flocculant employed. The effective amount may range from about 1 to about 50, typically from about 5 to about 30, and preferably from about 10 to about 20 parts of flocculant per million parts of phosphoric acid solution being treated.

As the preferred slightly anionic high molecular weight polyacrylamide flocculants are not too stable in acid for more than about a few hours, an aqueous master solution of the polyacrylamide of from about 0.1 to about 0.5 percent, preferably less than about 0.4% by weight of polyacrylamide in water, is first prepared and the solution diluted with phosphoric acid in small batches to a concentration of about 0.01 to about 0.1 percent, preferably 0.05% by weight before it is introduced into the phosphoric acid solution.

The aggregates or flocs of suspended inorganic crystalline salts and humic matter which are formed in the first step of the preferred process may be removed from the acid solution by allowing the aggregates to settle and removing the liquid from the settled mixture either by filtration, decantation, or other means well known to those skilled in this art.

The second step of the present process comprises further treating the aqueous solution with an effective amount of one or more phenol compounds sufficient to destabilize the colloidal humic matter which is contained in the solution and to aid in forming a froth, e.g., small but effective amount. The term "phenol compound" is meant to include any compound which contains a benzene ring with a hydroxyl group directly attached to a carbon atom of the benzene ring. These compounds include phenol itself as well as other derivatives of phenol such as ortho-, meta-, and para-cresol, catechol, resorcinol, hydro-quinone, ortho-, meta-, and para-aminophenols, nitro-phenols, and halo-substituted phenols, hydroxybenzoic acid, salicyclic acid, and derivatives thereof. Mixtures of two or more phenols may also be used and such are preferred. A particularly preferred phenol mixture is creosote which comprises a mixture of phenols and phenol derivatives obtained by the destructive distillation of wood-tar or by the fractional distillation of coal-tar.

The amount of phenol compound (e.g., creosote) which may be used in this step of the present process depends to some extent upon the phenol compound itself. However, generally an amount of from about 0.05 to about 5, typically from about 0.1 to about 1.0, and preferably from about 0.1 to about 0.5 gram of phenol compound per liter of aqueous phosphoric acid solution may be employed.

As stated hereinabove, the purpose of the phenol compound is to aid in the formation of froth in the subsequent flotation step, while, in addition, the phenol compound destabilizes the humic colloids which are present in the phosphoric acid solution. These destabilized colloids as well as any other solids which might be present in the phosphoric acid are substantially completely removed from the phosphoric acid solution during the subsequent separation step.

It is known to use creosote as a frother as disclosed in U.S. Pat. No. 2,713,420 for clarifying aqueous slurries derived from the beneficiation of coal. Furthermore, U.S. Pat. No. 3,637,348 discloses that 1-1,000 ppm of a flocculant, which may be cresol, may be added to freshly concentrated phosphoric acid in order to control post-precipitation. The addition of this flocculant causes a sludge present in concentrated phosphoric acid to precipitate more rapidly. No mention is made of froth flotation. In the book entitled The Extractive Metallurgy of Uranium by Robert C. Merritt (Copyright 1971 by The Colorado School of Mines Institute and assigned to the United States Atomic Energy Commission) a method is disclosed for controlling organics in uranium carbonate leach solutions by treating the solution in a flotation cell by using dialkyl quaternary ammonium salts with glue and creosote as flotation agents. However, it should be noted that the combination of materials employed as the flotation agent is employed in a different solution environment, i.e., a basic solution, and not in a phosphoric acid solution.

The third step of the present process comprises separating the humic matter from the phosphoric acid solution by froth flotation. Flotation is a well-known technique and need not be described. In this connection, reference is made to U.S. Pat. No. 2,440,514 and U.S. Pat. No. 2,713,420. Froth flotation is effected by aerating the treated solution for a time sufficient to float the aggregated colloidal particles to the top of the solution. The froth may then be removed by skimming and filtration, or other means well known to those skilled in this art.

The aeration and flotation time, depending upon the concentration of humic matter in the phosphoric acid solution, may range generally from about 3 to about 40, typically from about 5 to about 30, and preferably from about 10 to about 20 minutes.

The present process may be carried out in a batch, continuous, or semi-continuous manner as desired, although a continuous operation is preferred for reasons of economy.

In a preferred embodiment of the present invention, it is also desirable to add reagents which might aid in the subsequent flocculation of the suspended humic particles. Any such flocculation aid which is well known to those skilled in the art may be employed for this purpose, tannic acid being a particularly preferred flocculation aid. Quebracho, which is an extract of the South American Quebracho tree, is essentially all tannic acid and is preferably used in an amount sufficient to aid flocculation. Although the flocculation aid is not essential to the present invention, flocculation does not proceed as quickly and as effectively when the aforementioned flocculation aid is not used. It is known to use tannins to coagulate and precipitate colloids (note U.S. Pat. No. 2,133,251). In the present invention, the amount of tannin may range from about 0.05 to 1 gram per liter (gpl) of phosphoric acid solution, for example, from about 0.1 to 0.5 gpl.

Black phosphoric acid solution which is produced by the wet-process method is generally at a temperature of typically from about 55 to about 85° C. and contains from about 0.5 to about 3 percent solids by weight.

The temperature of the phosphoric acid solution during treatment according to the present process is usually adjusted so that the flash point of the kerosene or other solvent which is used during the subsequent solvent extraction of uranium is not exceeded. Preferably the temperature of the acid is adjusted to a temperature which is lower than needed in order to avoid solvent flashing. The reason for the use of the lower temperature is to avoid the formation of any dissolved salt supersaturation and crystallization after the final filtration step at a higher temperature. Accordingly, the phosphoric acid solution is cooled to a temperature of generally in the range of about 30 to 55, and preferably from about 35° to 50° C., e.g., 45° C., prior to treatment with the process of the present invention.

When kerosene is used as the solvent to extract the uranium from the phosphoric acid solution during the subsequent solvent extraction process, it is preferred that the temperature of the phosphoric acid solution be adjusted to between 40° and 55° C. prior to treatment according to the present process.

The present invention is further illustrated by the following example. All parts and percentages in the example, as well as in the specification and claims, are by weight unless otherwise specified.

EXAMPLE

The example will be described with relation to the accompanying flow sheet, which is a schematic of the process and apparatus which may be used in carrying out the process of the present invention.

Approximately 90 liters of black phosphoric acid, having a $P_2O_5$ concentration of 30 percent by weight, a solids content of about 1.5 percent by weight, and which is at a temperature of 60° C., is stored in acid storage tank 2 which has stirrer means 3. The acid is continuously pumped from storage tank 2 by pump means 4 to three series-cascade feed preparation tanks 5, 6 and 7 which contain stirring means 8, 9 and 10. The acid is super-saturated with respect to gypsum, sodium fluosilicate salts, and humics. Once the acid arrives in the feed preparation tanks, 27 grams of iron powder or an equivalent amount of a similar reducing agent is added to reduce the uranium from U(VI) to U(IV). The slurry EMF is thus reduced from about plus 260 millivolts to about 220 millivolts by platinum electrode determination.

Simultaneous with the uranium reduction, 18 grams of Quebracho, dissolved in 200 milliliters of water in tank 11 which contains stirring means 12, is pumped by pump means 13 into feed preparation tank 5. The Quebracho aids in the subsequent flocculation of the suspended organic fraction which is present in the acid solution.

The acid is pumped from the feed preparation tank 7 by pump means 14 through heat exchanger 15 where the acid is cooled to about 45° C. which is about 5° C. cooler than the desired operating temperature of the solvent extraction circuit.

The cooled acid now contains from about 1 to about 4% solids by weight and is sent to thickener 16 at a rate of 100 milliliters per minute. In the thickener 16, the solids are flocculated with about 10 parts of a slightly anionic high molecular weight flocculant per million parts of acid solution (Polyhall M-59 flocculant).

The flocculant is made up in flocculant makeup tank 17 which contains stirrer 18 by adding water to the flocculant such that the solution contains about 0.4% by weight flocculant in water. The flocculant solution, after being made up, is then pumped by pump means 19 to the flocculant stock solution container 20 which contains stirrer means 21. The flocculant solution is diluted to about 0.05% by weight with acid in the flocculant stock solution and is then pumped by pump means 22 through line 23, where it mixes with the acid solution coming from heat exchanger 15 through line 24. The flocculant solution is thus diluted in the flocculant stock solution tank with acid in small batches to about 0.05 by weight before being introduced to the slurry stream.

The underflow of the thickener is pumped to a drum filter (not shown) where the solids (cake) from the drum filter are washed with uranium free acid (raffinate) from the solvent extraction circuit and are then sent back to the acid plant. The acid wash of the cake recovers any occluded uranium in the solids. The filtrate from the drum filter is sent to conditioning tank 25 which contains stirring means 26.

The overflow of the thickener contains about 0.2 to about 1.0 gram per liter of solids which are mostly humates. This overflow is sent to conditioning tank 25. One-half milliliter of creosote is added to about 1500 milliliters of the overflow in conditioning tank 25. The creosote aids in the formation of froth in the subsequent flotation steps and also to destabilize the colloids in the black acid. These destabilized colloids, as well as the solids in the thickener overflow acid, are substantially completely collected in rougher flotation cells 27 from the main stream of the acid.

The creosote-treated acid solution is pumped from conditioning tank 25 by pump means 40 to rougher flotation cells 27 which are 2-liter flotation cells. The air is turned on in these cells and the organic matter is floated off. The total float time is 10 minutes and the flotation temperature is about 45° C. This process is repeated four more times and generates 1200 milliliters of froth.

About 15% of the volume of the acid sent to rougher flotation cells 27 reports to the froth and contains the bulk of the solids (1 to 6 grams per liter of acid). The froth is then sent to cleaner flotation cells 28 where the solids are refloated without additional chemical additives. The froth from the flotation circuit averages about 40% of the volume fed to the circuit and thus concentrates solids into an acid stream containing from about 3 to about 15 grams per liter of solids. This stream is about 6% of the thickener overflow volume.

The solution from cleaner flotation cells 28 is sent to surge tank 29 which contains stirring means 30. The solution is then pumped by pump means 31 to pressure filter 32 for solids removal. The cake collected on the pressure filter is washed free of soluble phosphate values with a water wash and is sent to waste. The filtrate from this step, as well as the cleaner flotation underflow, is recycled to conditioning tank 25 for residual humate removal. These two streams may be sent directly to clarification filters 36 if their humate content is sufficiently low.

The underflow from rougher flotation cells 27 passes to filter surge tank 33 which contains stirring means 34. From there, it is pumped by pump means 35 to clarification filters 36. It is then sent through heat exchanger 37 where it is heated about 5° C. to the solvent extraction operating temperature to eliminate any super-saturation and associated salt crystallization. The solution is now ready for uranium recovery by solvent extraction.

The process disclosed converts the acid from a black slurry to a clear dark amber liquid.

The apparati used in carrying out the process of the present invention are well known to those skilled in this art and are generally commercially available.

The process described above is carried out at substantially atmospheric pressure unless otherwise noted.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in this art without departing from the spirit of the invention.

What is claimed is:

1. A process for removing colloidal and non-colloidal humic matter from an aqueous solution of phosphoric acid, said process consisting essentially of the steps of:
    a. treating said solution with an effective amount of a tannin as a flocculating aid and an effective amount of a slightly anionic high molecular weight polyacrylamide flocculant sufficient to form aggregates or flocs of humic matter;
    b. further treating said aqueous solution following removal of a majority of the flocs with an effective amount of one or more phenol compounds sufficient to destabilize said colloidal humic matter contained in said solution and aid in forming a froth of said humic matter; and
    c. then separating said humic matter from said solution by froth flotation.

2. The process of claim 1, wherein an effective amount in the range of about 1 to about 50 parts of said polyacrylamide per million parts of acid solution is added to the phosphoric acid solution.

3. The process of claim 2, wherein the effective amount of said polyacrylamide ranges from about 5 to 30 parts per million.

4. The process of claim 1, wherein the phenol compound added is an effective amount in the range of about 0.05 to about 5 grams of creosote per liter of phosphoric acid solution.

5. The process of claim 4, wherein the effective amount of creosote ranges from about 0.1 to 1 gram per liter.

6. The process of claim 1, wherein an effective amount in the range of about 0.05 to 1 gram of said tannin is added per liter of phosphoric acid solution.

7. The process of claim 1, wherein said phosphoric acid solution has a phosphoric acid concentration as $P_2O_5$ of from about 15 to about 55 percent by weight based upon the weight of the solution.

8. The process of claim 7, wherein the concentration of phosphoric acid ranges from about 25% to 35% by weight of $P_2O_5$.

9. A process for removing colloidal and noncolloidal humic matter from an aqueous solution which comprises from about 15 to 55 percent by weight phosphoric acid as $P_2O_5$ based upon the weight of said solution, said process consisting essentially of the steps of:
    a. treating said solution with an effective amount of a tannin sufficient to aid flocculation of said matter;
    b. further treating said solution with an effective amount of a slightly anionic high molecular weight polyacrylamide sufficient to form aggregates or flocs of said humic matter;
    c. further treating said aqueous solution following removal of a majority of said flocs with an effective amount of creosote sufficient to destabilize said colloidal humic matter contained in said solution and aid in the froth flotation thereof; and
    d. separating said humic matter from said solution by froth flotation.

10. The process of claim 9, wherein said aqueous phosphoric acid solution is treated with effective amounts of from about 0.05 to 1 gram/liter of said tannin, from about 1 to 50 parts per million of said polyacrylamide, and from about 0.05 to about 5 grams/liter of said creosote.

11. The process of claim 9, wherein said phosphoric acid solution contains about 25% to 35% by weight of $P_2O_5$, and wherein said solution is treated with effective amounts of about 0.1 to 0.5 gpl of said tannin, about 5 to 30 parts per million of said polyacrylamide, and about 0.1 to 1 gpl of said creosote.

* * * * *